US012565223B2

(12) United States Patent
    Ji

(10) Patent No.:  US 12,565,223 B2
(45) Date of Patent:      Mar. 3, 2026

(54) VEHICLE HAVING SENSOR REDUNDANCY

(71) Applicant: Beijing OCGen Technology Co., Ltd., Beijing (CN)

(72) Inventor: Pingyuan Ji, Beijing (CN)

(73) Assignee: BEIJING OCGEN TECHNOLOGY CO., LTD., Beijing (CN)

( * ) Notice: Subject to any disclaimer, the term of this patent is extended or adjusted under 35 U.S.C. 154(b) by 260 days.

(21) Appl. No.: 18/118,899

(22) Filed: Mar. 8, 2023

(65) Prior Publication Data

US 2023/0286522 A1     Sep. 14, 2023

(30) Foreign Application Priority Data

Mar. 9, 2022     (CN) .......................... 202210224663.6

(51) Int. Cl.
    B60W 50/023      (2012.01)
    G01S 13/87       (2006.01)
    G01S 13/931      (2020.01)
    G01S 17/931      (2020.01)

(52) U.S. Cl.
    CPC ..... B60W 50/023 (2013.01); B60W 2420/403 (2013.01); B60W 2420/408 (2024.01); B60W 2720/10 (2013.01); B60W 2720/24 (2013.01)

(58) Field of Classification Search
    None
    See application file for complete search history.

(56) References Cited

U.S. PATENT DOCUMENTS

2020/0180653 A1*  6/2020  Chi ..................... B60W 50/029
2021/0163021 A1   6/2021  Frazzoli et al.

2021/0318444 A1*  10/2021  Li .......................... G01S 7/4034
2021/0325529 A1*  10/2021  Koga ........................ B65F 3/02
2022/0327843 A1*  10/2022  Belman ............... G06V 20/588
2025/0037445 A1*  1/2025  Bund .................... G06F 18/251

FOREIGN PATENT DOCUMENTS

CN      110588538      12/2019
CN      210554544      5/2020
CN      212737879      3/2021
CN      113195329      7/2021
DE      102013020177   6/2014

OTHER PUBLICATIONS

Lengyel, Henrietta et al., "The Significance and Effect of the Traffic System Signaling to the Environment, Present and Future Traffic," Jan. 22, 2019, ResearchGate, Jan. 2019 Chapter, pp. 1-10 (Year: 2019).*
Extended European Search Report in European Appln. No. 23159371. 6, dated Jun. 15, 2023, 10 pages.

* cited by examiner

*Primary Examiner* — Madison R. Inserra
(74) *Attorney, Agent, or Firm* — Fish & Richardson P.C.

(57)                    ABSTRACT

The present disclosure relates to a vehicle having sensor redundancy. The vehicle includes a sensor system including a first sensor subsystem configured for acquiring environmental information around the vehicle; a second sensor subsystem configured for acquiring environmental information around the vehicle; a computing system configured for sending a control instruction generated based on one of the first sensor subsystem and the second sensor subsystem to a control system according to a state of at least one of the computing system and the sensor system; a control system configured for changing at least one of a direction of travel and a speed of the vehicle based on the control instruction received from the computing system.

16 Claims, 6 Drawing Sheets

<u>110</u>

| Drive system | Sensor system | Control system | Computing system | Communication system |
|---|---|---|---|---|
| Engine/ motor | Sensor subsystem | Steering | Computing / control device | Communication device |
| Wheels | IMU | Power control | Memory | 152 |
| Transmission | GPS | Braking | Processor | |
| Electrical system | Radar | Navigation | Autonomous driving control unit | |
| Power | LIDAR | | | |
| | Camera | | | |
| 142 | 144 | 146 | 150 | |

160

162

VEHICLE HAVING SENSOR REDUNDANCY

CROSS REFERENCE TO RELATED APPLICATIONS

The present disclosure claims priority to Chinese Patent Application No. 202210224663.6, entitled "Vehicle Having Sensor Redundancy," filed on Mar. 9, 2022, the content of which is incorporated herein by reference in its entirety.

TECHNICAL FIELD

The present disclosure relates to a vehicle, and more particularly to a vehicle having sensor redundancy.

BACKGROUND

When a vehicle is faced with various driving environments, a reliable perception of the surrounding environment is essential for the vehicle to make correct and safe decisions, especially in the field of autonomous driving, where the perception capability has an important influence. Sensors such as cameras are usually configured on a vehicle to sense the environmental information in the surrounding environment. The sensors on the vehicle need to be rationally arranged to ensure reliable sensing of the environmental information in the surrounding environment of the vehicle in various driving environments to ensure the driving reliability and safety of the vehicle.

SUMMARY

The present disclosure provides a vehicle having sensor redundancy that can reliably sense environmental information around the vehicle.

In one aspect, the present disclosure provides a vehicle including:

a sensor system including:

a first sensor subsystem configured for acquiring environmental information around the vehicle;

a second sensor subsystem configured for acquiring environmental information around the vehicle, a computing system configured for sending a control instruction generated based on the first sensor subsystem or the second sensor subsystem to a control system according to the state of the sensor system; and the control system configured for changing at least one of a direction of travel and a speed of the vehicle based on the control instruction received from the computing system.

In another aspect, the present disclosure provides a method for controlling a vehicle including:

a control system, and a sensor system including:

a first sensor subsystem configured for acquiring environmental information around the vehicle;

a second sensor subsystem configured for acquiring environmental information around the vehicle, the method including:

sending a control instruction generated based on the first sensor subsystem or the second sensor subsystem to a control system based on at least a state of the sensor system so that the control system changes at least one of a direction of travel and a speed of the vehicle based on the control instruction.

In another aspect, the present disclosure provides a computing apparatus including:

one or more processors; and a memory having program instructions stored thereon which, when executed by the one or more processors, cause the computing apparatus to perform the method described in this disclosure.

In another aspect, the present disclosure provides a computer-readable storage medium having a program stored thereon, the program, including instructions which, when executed by one or more processors of a computing apparatus, cause the computing apparatus to perform a method described in the present disclosure.

According to the present disclosure, by providing a vehicle with redundant sensor subsystems, the vehicle can reliably sense environmental information in the surrounding environment through the redundant sensor subsystems when one of the sensor subsystems fails, so that vehicle driving reliability and safety can be ensured.

It should be understood that the content in this section is not intended to identify key or critical features of the embodiments of the disclosure, nor is it intended to limit the scope of the disclosure. Other features of the disclosure will become readily apparent from the following description.

BRIEF DESCRIPTION OF THE DRAWINGS

The accompanying drawings, which constitute a part of this specification, illustrate embodiments and, together with the description, serve to explain exemplary embodiments of the embodiments. The illustrated embodiments are for illustrative purposes only and do not limit the scope of the claims. Throughout the drawings, the same reference numerals indicate similar, but not necessarily identical, elements.

Wherever possible, the same reference numbers have been used to designate the same elements that are common to the figures. It is contemplated that elements disclosed in one implementation may be beneficially employed in other implementations without specific recitation.

DETAILED DESCRIPTION

Figure 1:
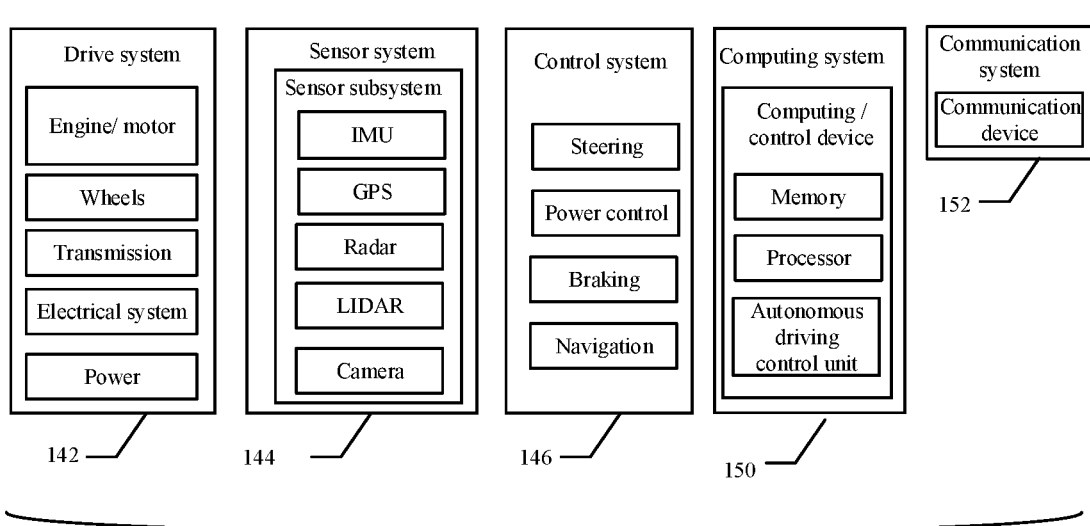
FIG. 1 shows a block diagram of a vehicle according to an example embodiment of the present disclosure.
Figure 1:
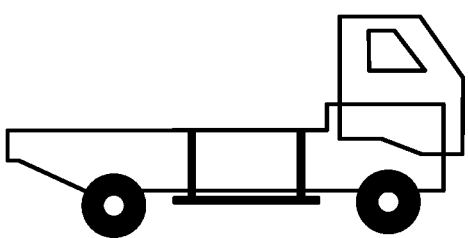

The following describes exemplary embodiments of the disclosure with reference to the accompanying drawings, which include various details of the embodiments of the disclosure to facilitate understanding, and should be considered as merely exemplary. Accordingly, one of ordinary skill in the art appreciates that various changes and modifications can be made to the embodiments described herein without departing from the scope of the disclosure. Also, descriptions of well-known functions and constructions are omitted from the following description for clarity and conciseness.

In this disclosure, the use of the terms "first", "second", and the like to describe various elements is not intended to limit the positional, timing, or importance relationships of the elements unless otherwise indicated. Such terms are used solely to distinguish one element from another. In some instances, a first element and a second element may refer to the same instance of the element. In some cases, they may refer to different instances based on the context. In this disclosure, unless stated otherwise, where a physical quantity is stated to be any value between A and B, the value of the physical quantity may be either A or B.

The terminology used in the description of the various illustrated examples in this disclosure is for the purpose of describing particular examples only and is not intended to be limiting. Unless the context clearly indicates otherwise, if the number of an element is not expressly limited, the element can be one or more. Furthermore, the term "and/or" as used in this disclosure encompasses any and all possible combinations of the listed items.

Currently in the field of autonomous driving, autonomous driving technology is often reactive, that is, decisions are based on current conditions or states. For example, an autonomous vehicle may be programmed to stop urgently when an object in the middle of a road is detected. However, current autonomous driving technology has limited vehicle perception and environmental adaptability to objects in the surrounding environment. In order to ensure the reliable sensing of environmental information in the surrounding environment of the vehicle, the sensors on the vehicle need to be reasonably arranged, so as to ensure the reliability and safety of vehicle driving.

The present disclosure describes a vehicle that ensures vehicle driving reliability and safety by rationalizing the arrangement of sensors on the vehicle. By rationally arranging the sensors on the vehicle according to the present application, not only sensor redundancy can be provided, but also the sensing range can be provided as large as possible. The blind area which may threaten the driving safety can be reduced or avoided, so that the autonomous driving control unit can rationally plan the driving path or trajectory of the vehicle, thereby ensuring the driving reliability and safety of the vehicle.

By rationalizing the arrangement of the sensors on the vehicle according to the present application, the number of sensors can also be saved. The excessive number of sensors not only presents a significant challenge to vehicle integration, but also increases the cost of the vehicle. In addition, since the number of power consuming apparatuses that can be installed on the vehicle is limited due to the limited power supply on the vehicle, the present application can satisfy the limited power supply on the vehicle by rationally arranging the sensors on the vehicle.

FIG. 1 is a schematic view of an exemplary vehicle 110. Although the vehicle 110 is illustrated in FIG. 1 as a truck, those skilled in the art will appreciate that the vehicle 110 may also be any vehicle or transport such as a car, bus, etc.

The vehicle 110 may include various vehicle systems, such as a drive system 142, a sensor system 144, a control system 146, a computing system 150, and a communication system 152. The vehicle 110 may include more or fewer systems, each of which may include multiple units. Further, each system and unit of the vehicle 110 may be interconnected. For example, the computing system 150 can be in data communication with one or more units of the drive system 142, the sensor system 144, the control system 146, and the communication system 152.

The vehicle 110 may include an autonomous driving (which may also be referred to as unmanned) system to be able to operate fully or partially in an autonomous driving mode. In this sense, the vehicle 110 is also referred to as an autonomous vehicle. The vehicle 110 may control itself (or the vehicle is controlled by the autonomous driving system) in the autonomous driving mode. For example, the vehicle 110 may determine a current state of the vehicle and a current state of an environment in which the vehicle is located, determine a predicted behavior of at least one other vehicle in the environment, determine a level of trust corresponding to a likelihood that the at least one other vehicle will perform the predicted behavior, and control the vehicle 110 itself based on the determined information. Under the autonomous driving mode, the vehicle 110 may operate without human interaction. The autonomous driving system of the vehicle 110 may include, for example, a sensor system 144 and a computing system 150.

The drive system 142 may include a plurality of operable components (or units) that provide kinetic energy to the vehicle 110. In an embodiment, the drive system 142 may include an engine or motor, wheels, transmission, an electrical system, and power (source of power).

The sensor system 144 may include multiple sensor subsystems (although only one sensor subsystem is shown in FIG. 1). Each sensor subsystem includes one or more sensors for sensing condition information and environmental information around the vehicle 110 in various travel environments. Each sensor subsystem may include one or more of an inertial measurement unit (IMU), a global navigation satellite system (GNSS) transceiver (e.g., a global positioning system (GPS) transceiver), a radio detection and ranging device (RADAR), a laser detection and ranging system (LIDAR), an acoustic sensor, an ultrasound sensor, and an image capture device (e.g., a camera). The one or more sensors included in each sensor subsystem may be driven individually or collectively to update the position, orientation, or both of the one or more sensors.

Each sensor may be coupled or secured to the vehicle using nails, screws, tape, adhesives, welding, soldering, bolts, or similar materials. The sensor may be coupled or secured to a luggage rack or bracket along the top or bottom of the vehicle. The sensor may be coupled or fixed to the top, side, front or rear of the vehicle. The sensor may be attached or fixed to the front grille, fender or mirror of the vehicle. The sensor may be coupled or fixed to any exterior portion of the vehicle.

In some embodiments, the sensor system 144 may include two sensor subsystems for redundancy, where one sensor subsystem is a sensor master system and the other sensor subsystem is redundancy of the sensor master system, also referred to as a sensor slave system.

In some embodiments, the sensor system 144 includes a sensor backup system in addition to the sensor master system and the sensor slave system to serve as redundancy for the sensor master system and the sensor slave system. The sensor slave system may have fewer sensors than the sensor master system, and likewise, the sensor backup system may have fewer sensors than the sensor slave system.

The control system 146 is used to control the operation of the vehicle 110 and its components (or units). Accordingly, the control system 146 may include various units, such as a steering unit, a power control unit, a braking unit, and a navigation unit. The steering unit may be a combination of machines that adjust the direction of travel of the vehicle 110. The steering unit may include, for example, a steering motor that steers a steered wheel of the vehicle by operating a steering mechanism including a steering shaft and a steering gear. The power control unit may be used to control the operating speed of the engine and thus the speed of the vehicle 110. The power control unit may include, for example, an engine actuator for changing a working state of an engine of the vehicle. One example of the engine is an internal combustion engine of a throttle valve for adjusting an intake air amount. At this time, the engine actuator may include a throttle actuator that changes an opening degree of the throttle valve. By controlling the engine actuator, the driving force of the vehicle can be controlled to change the acceleration state. The braking unit may include a combination of machines for decelerating the vehicle 110. The braking unit can decelerate the vehicle with friction in a standard manner. The braking unit may include a brake actuator that may adjust friction between a brake pad of the vehicle and a brake disc fixed to the wheel to generate a braking torque to oppose movement of the vehicle. The navigation unit may be any system that determines a driving path or route for the vehicle 110. The navigation unit may also dynamically update the driving path during travel of the vehicle 110.

The communication system 152 may include one or more communication devices to provide a way for vehicle 110 to communicate with one or more apparatuses or other surrounding vehicles. In an exemplary embodiment, each communication device of the communication system 152 may communicate with one or more apparatuses either directly or through a communication network. The communication system 152 may be, for example, a wireless communication system. For example, the communication device of the communication system may use 3G cellular communication (e.g., CDMA, EVDO, GSM/GPRS) or 4G cellular communication (e.g., WiMAX or LTE), and may also use 5G cellular communication.

The computing system 150 may include one or more computing devices (and/or control devices) for controlling some or all of the functions of vehicle 110. Each computing device (or control device) includes at least one processor (which may include at least one microprocessor) that executes processing instructions (i.e., machine-executable instructions) stored in a non-volatile computer-readable medium (such as a data storage device or memory). In some embodiments, the memory may contain processing instructions (e.g., program logic) that are executed by the processor to perform various functions of the vehicle 110. One or more of the computing devices (and/or control devices) may include an autonomous driving control unit. The autonomous driving control unit may be used to identify, evaluate, and avoid or cross potential obstacles in the environment in which the vehicle 110 is located. In general, the autonomous driving control unit may be used to control the vehicle 110 without a driver, or to provide assistance for the driver to control the vehicle. In some embodiments, the autonomous driving control unit is configured to combine data from sensors, such as GPS transceiver data, radar data, LIDAR data, camera data, and data from other vehicle systems to determine a travel path or trajectory of the vehicle 110. The autonomous driving control unit may be activated to enable the vehicle 110 to be driven in an autonomous driving mode.

In some embodiments, the computing system 150 includes at least two computing devices, where one computing device receives data of the sensor master system (the computing device is also referred to as a master computing device), and the other computing device receives data of the sensor slave system (the computing device is also referred to as a slave computing device) as redundancy of the master computing device. In some embodiments, in addition to the master computing device and the slave computing device, the computing system 150 includes, as redundancy, a backup computing device that receives data from the sensor backup system. The master computing device, the slave computing device, and the backup computing device may have the same computational resources or may have different computational resources. For example, the slave computing device may have fewer computational resources than the master computing device and the backup computing device may have fewer computational resources than the slave computing device.

In some embodiments, the computing device of computing system 150 may be a computer or a server. The control device of computing system 150 may include an electronic control unit (ECU) or a vehicle control unit (VCU).

Although the autonomous driving control unit is shown separate from the processor and memory in FIG. 1, it should be understood that in some embodiments, some or all of the functions of the autonomous driving control unit may be implemented with program code instructions residing in one or more memories (or data storage devices) and executed by one or more processors. The autonomous driving control unit may in some cases be implemented using the same processor and/or memory (or data storage device). In some embodiments, the autonomous driving control unit may be implemented at least in part using various dedicated circuit logic, various processors, various field programmable gate arrays ("FPGA"), various application-specific integrated circuits ("ASIC"), various real-time controllers, and hardware.

Figure 2:
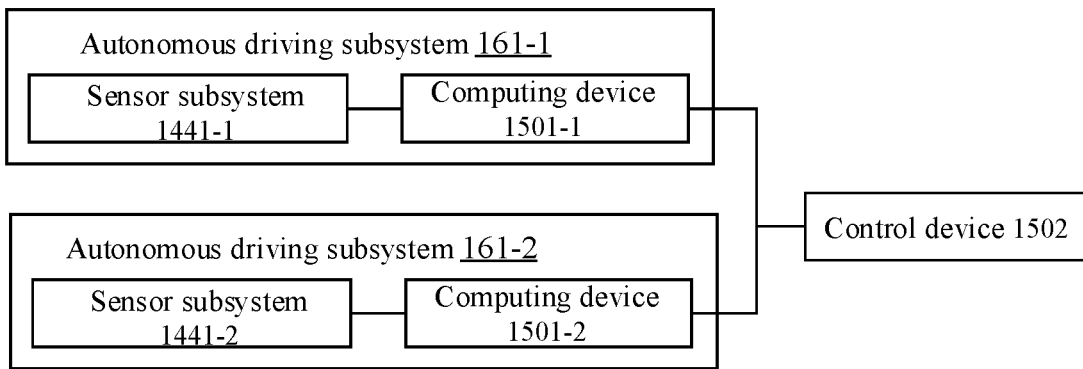
FIG. 2 shows an exemplary block diagram of an autonomous driving system of a vehicle according to an exemplary embodiment of the present disclosure.

FIG. 2 shows an exemplary block diagram of an autonomous driving system of a vehicle 110 according to an exemplary embodiment. As shown in FIG. 2, the autonomous driving system 160 of the vehicle 110 includes a plurality of autonomous driving subsystems constituting redundancy, for example, an autonomous driving subsystem 161-1 as a master autonomous driving system and an autonomous driving subsystem 161-2 as a slave autonomous driving system. Each autonomous driving subsystem includes at least one sensor subsystem (e.g., the sensor subsystem in sensor system 144 shown in FIG. 1) and at least one computing device (e.g., the computing device in computing system 150 shown in FIG. 1). The master autonomous driving system includes at least a sensor subsystem 1441-1 as a sensor master system and a computing device 1501-1 as a master computing device. The slave autonomous driving system includes at least a sensor subsystem 1441-2 as a sensor slave system and a computing device 1501-2 as a slave computing device. The autonomous driving system 160 also includes one or more control devices, such as a control device 1502 (which may be a control device in the computing system 150 shown in FIG. 1).

As shown in FIG. 2, both the master autonomous driving system and the slave autonomous driving system are connected to the control device, and then connected to other systems of the vehicle, such as the control system 146, via the control device. That is to say, when the master autonomous driving system and the slave autonomous driving system send an instruction to the control system, the instruction will be sent to the control device, and then forwarded to the control system by the control device. When the master autonomous driving system is operating normally, the control device forwards the instruction of the master autonomous driving system to the control system, but does not forward the instruction from the slave autonomous driving system to the control system. At this time, the running and stopping of the vehicle is controlled by the master autonomous driving system. If the control device determines that the master autonomous driving system has failed (e.g., the sensor subsystem and/or the computing device of the master autonomous driving system has failed), and determines that the master autonomous driving system cannot fulfill the safety requirement of the vehicle according to the nature or degree of the failure, and the slave autonomous driving system operates normally, then the control device does not forward the instruction of the master autonomous driving system to the control system, but forwards the instruction of the slave autonomous driving system to the control system. At this time, the running and stopping of the vehicle is controlled by the slave autonomous driving system.

In the case where the autonomous driving system 160 includes a plurality of control devices, at least two of the control devices may constitute redundancy. Both the control devices constituting redundancy are connected to each of the autonomous driving subsystems and the control system.

Figure 3:
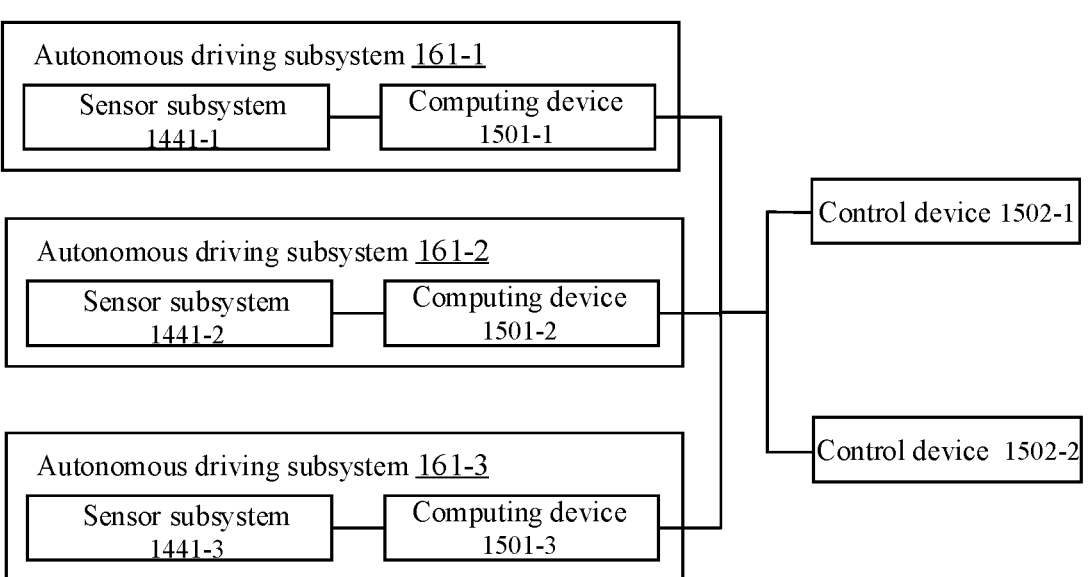
FIG. 3 shows an exemplary block diagram of an autonomous driving system of a vehicle according to another exemplary embodiment of the present disclosure.

FIG. 3 shows an exemplary block diagram of an autonomous driving system of a vehicle 110 according to another exemplary embodiment. The autonomous driving system of FIG. 3 differs from the autonomous driving system of FIG. 2 in that the autonomous driving system of FIG. 3 further includes a backup autonomous driving system, and two control devices constituting redundancy are shown in FIG. 3. Hereinafter, the same elements or components of FIGS. 2 and 3 will be denoted by the same reference numerals. Differences between FIG. 3 and FIG. 2 will be mainly described below. As shown in FIG. 3, the autonomous driving system 162 of the vehicle 110 includes the autonomous driving subsystem 161-3 as a backup autonomous driving system in addition to the autonomous driving subsystem 161-1 as a master autonomous driving system and the autonomous driving subsystem 161-2 as a slave autonomous driving system. The backup autonomous driving system includes at least a sensor subsystem 1441-3 as a sensor backup system and a computing device 1501-3 as a backup computing device.

As shown in FIG. 3, the master autonomous driving system, the slave autonomous driving system, and the backup autonomous driving system are all connected to the control device, and then connected to other systems of the vehicle, such as the control system 146, via the control device. That is, when the master autonomous driving system, the slave autonomous driving system, and the backup autonomous driving system send an instruction to the control system, the instruction will be sent to the control device first, and then forwarded to the control system by the control device. When the master autonomous driving system is normally operated, the control device forwards the instruction of the master autonomous driving system to the control system, but does not forward the instruction of the slave autonomous driving system and the backup autonomous driving system to the control system. At this time, the running and stopping of the vehicle is controlled by the master autonomous driving system. If the control device determines that the master autonomous driving system has a failure, and determines that the master autonomous driving system cannot fulfill the safety requirement of the vehicle according to the nature or degree of the failure, and the slave autonomous driving system operates normally, then the control device does not forward the instruction of the master autonomous driving system to the control system, but forwards the instruction of the slave autonomous driving system to the control system. At this time, the running and stopping of the vehicle are controlled by the slave autonomous driving system. Also, if the control device determines that both the master autonomous driving system and the slave autonomous driving system have a failure, and determines that both the master and slave autonomous driving systems cannot meet the safety requirements of the vehicle according to the nature or degree of the failure, then the control device does not forward the instruction of the master and slave autonomous driving systems to the control system, but forwards the instruction of the backup autonomous driving system to the control system. At this time, the running and stopping of the vehicle are controlled by the backup autonomous driving system.

As shown in FIG. 3, the autonomous driving system 160-1 includes a control device 1502-1 and a control device 1502-2 (e.g., the control device in the computing system 150 shown in FIG. 1), where one control device may serve as a redundancy for another control device. The control device 1502-1 and the control device 1502-2 may have the same structure, communicate with each other, and are both connected to the respective autonomous driving subsystem and the control system.

One of the control device 1502-1 and the control device 1502-2 may be a master control device, and the other may be a slave control device. When the master control device is normally operated, no data or instructions are forwarded by the slave control device to other devices or systems or control any other device or system. When the master control device fails (e.g., the slave control device determines that the master control device fails by data received from the master control device), the slave control device substitutes for the master control device to perform various functions performed by the master control device. The failed master control device may be changed as a slave control device or stop operating.

While various components (or units) integrated into the vehicle 110 are shown in FIGS. 1, 2, and 3, one or more of these components (or units) may be onboard the vehicle 110 or separately associated with the vehicle 110. For example, the computing system may exist partially or completely independent of the vehicle 110. Thus, the vehicle 110 can exist as a separate or integrated unit of apparatus. The apparatus or units constituting the vehicle 110 may communicate with each other by wire communication or wireless communication. In some embodiments, additional components or units may be added to each system or one or more parts or units (e.g., the LiDAR or radar shown in FIG. 1) may be removed from each system.

Figure 4:
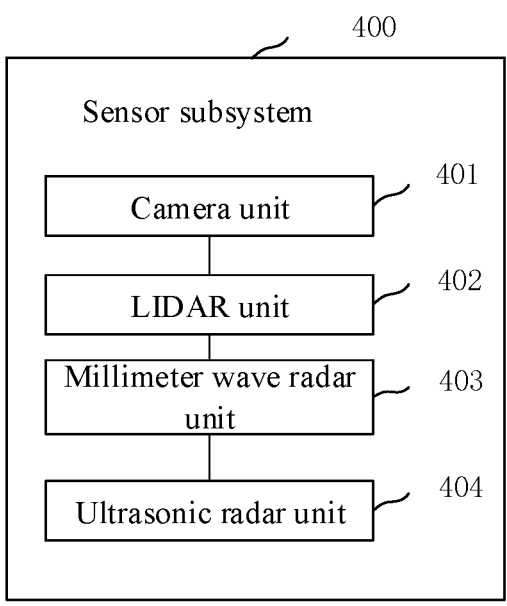
FIG. 4 shows a block diagram of a sensor subsystem according to an example embodiment.
Figure 5:
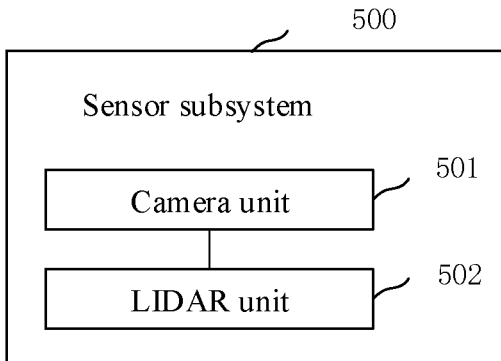
FIG. 5 shows a block diagram of a sensor subsystem according to another example embodiment.
Figure 6:
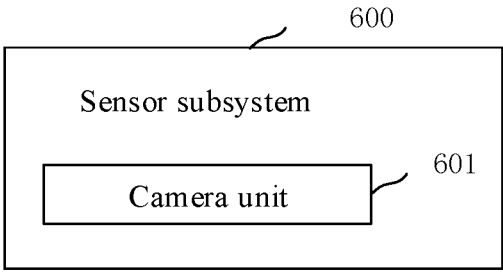
FIG. 6 shows a block diagram of a sensor subsystem according to yet another example embodiment.

Each of the sensor subsystems shown in FIGS. 2 and 3 may include one or more sensor units. FIG. 4 is a structurally schematic diagram of a sensor subsystem according to an exemplary embodiment of the present disclosure. FIG. 5 is a structurally schematic diagram of a sensor subsystem according to another exemplary embodiment of the present disclosure. FIG. 6 is a structurally schematic diagram of a sensor subsystem according to yet another exemplary embodiment of the present disclosure. The sensor subsystem shown in FIG. 4 may be, for example, the sensor subsystem 1441-1 shown in FIGS. 2 and 3, i.e., a sensor master system. The sensor subsystem shown in FIG. 5 may be, for example, the sensor subsystem 1441-2 shown in FIGS. 2 and 3, i.e., a sensor slave system. The sensor subsystem shown in FIG. 6 may be, for example, the sensor subsystem 1441-3 shown in FIG. 3, i.e., a sensor backup system.

As shown in FIG. 4, the sensor subsystem 400 (e.g., a sensor master system) includes four sensor units. In the example shown in FIG. 5, the sensor subsystem 500 (e.g., a sensor slave system) includes two sensor units. In the example shown in FIG. 6, the sensor subsystem 600 (e.g., a sensor backup system) includes one sensor unit. Those skilled in the art will appreciate that the sensor master system, sensor slave system, and sensor backup system may each have more or fewer sensor units. For example, the sensor subsystem 400 may also include a positioning unit, which may include an IMU and/or GPS transceiver.

In some embodiments, each sensor unit includes at least one type of sensor, and different sensor units include different types of sensors. Referring to FIG. 4, a first type of sensor unit of the sensor subsystem 400 is a camera unit 401. A second type of sensor unit is a LIDAR unit 402. A third type of sensor unit is a millimeter wave radar unit 403. A fourth type of sensor unit is an ultrasonic radar unit 404. Referring to FIG. 5, a first type of sensor unit of the sensor subsystem 500 is a camera unit 501 and a second type of sensor unit is a LIDAR unit 502. Referring to FIG. 6, the sensor subsystem 600 includes a camera unit 601. The camera unit 401, the camera unit 501, and the camera unit 601 each include at least one camera. The LIDAR unit 402 and the LIDAR unit 502 each include at least one LIDAR. The millimeter wave radar unit 403 includes at least one millimeter wave radar. The ultrasonic radar unit 404 includes at least one ultrasonic radar.

According to the present application, the sensors are rationally arranged on a vehicle so as to provide a plurality of mutually redundant sensor subsystems for the vehicle. When one sensor subsystem fails, the vehicle can reliably sense environmental information in the surrounding environment via the remaining sensor subsystems, thereby ensuring vehicle driving reliability and safety. In accordance with the present application, different sensor units within the same subsystem may also be appropriately coordinated with each other to provide redundancy to accommodate a variety of different environments. According to the present application, by rationalizing the arrangement of sensors on a vehicle, it is possible not only to provide sensor redundancy, but also to reduce or avoid blind areas that may threaten driving safety, so as to provide as large a sensing range as possible, while saving the number of sensors. By appropriately configuring and combining different types of sensors of the vehicle to cooperate with each other, a better sensing effect is obtained.

In some embodiments, each sensor subsystem of the vehicle may include one or more sensor units, each sensor unit corresponding to at least one type of sensor (different sensor units corresponding to different types of sensors). The sensors of each sensor unit may be divided into one or more sets. By appropriately configuring the sensors of each set, environmental information around the vehicle is reliably sensed in various driving environments.

The sensor arrangement of the sensor master system, the sensor slave system and the sensor backup system is described one by one by taking the sensor subsystem 400 as the sensor master system, the sensor subsystem 500 as the sensor slave system and the sensor subsystem 600 as the sensor backup system as an example.

Sensor Master System

With describing first a sensor arrangement of a sensor master system, a first sensor unit (e.g., a camera unit) of the sensor master system may include a first set of sensors (i.e., a first set of sensors of a first type) configured for sensing objects within a first horizontal sensing range relative to the vehicle. The first horizontal sensing range is determined by the horizontal field of view, the maximum sensing distance and the minimum sensing distance of the first set of sensors of the first type.

The first sensor unit of the sensor master system may further include a second set of sensors (i.e., a second set of sensors of the first type) configured for sensing objects within a second horizontal sensing range relative to the vehicle. The second horizontal sensing range is determined by the horizontal field of view, the minimum sensing distance and the maximum sensing distance of the second set of sensors of the first type.

The first sensor unit of the sensor master system may further include a third set of sensors (i.e., a third set of sensors of the first type) configured for sensing objects within a third horizontal sensing range relative to the vehicle. The third horizontal sensing range is determined by the horizontal field of view, the minimum sensing distance and the maximum sensing distance of the third set of sensors of the first type.

In some embodiments, the maximum sensing distance of the first set of sensors of the first type is greater than or equal to the minimum sensing distance of the second set of sensors of the first type and less than the minimum sensing distance of the third set of sensors of the first type and the maximum sensing distance of the second set of sensors of the first type. The maximum sensing distance of the second set of sensors of the first type is greater than or equal to the minimum sensing distance of the third set of sensors of the first type and greater than the maximum sensing distance of the first set of sensors of the first type. The minimum sensing distance of the third set of sensors of the first type is greater than the minimum sensing distance of the second set of sensors of the first type. The maximum sensing distance of the third set of sensors of the first type is greater than the maximum sensing distance of the second set of sensors of the first type.

In some embodiments, the maximum sensing distance of the first set of sensors of the first type is any value between 100 and 300 meters, or any value between 100 and 200 meters, or any value between 200 and 300 meters. The minimum sensing distance of the first set of sensors of the first type may be any value between 0 and 10 meters. The second set of sensors of the first type has a maximum sensing distance of any value between 400 and 600 meters, or between 400 and 500 meters, or between 500 and 600 meters. The second set of sensors of the first type has a minimum sensing distance of any value between 100 and 300 meters, or any value between 100 and 200 meters, or any value between 200 and 300 meters. The maximum sensing distance of the third set of sensors of the first type may be any value between 700 and 1500 meters, or between 800 and 1200 meters, or between 900 and 1100 meters. The minimum sensing distance of the third set of sensors of the first type may be any value between 400 and 600 meters, or between 400 and 500 meters, or between 500 and 600 meters.

In some embodiments, the second set of sensors of the first type has a horizontal field of view that is less than or equal to the horizontal field of view of the first set of sensors of the first type. The third set of sensors of the first type has a horizontal field of view that is less than or equal to the horizontal field of view of the second set of sensors of the first type. For example, the first set of sensors of the first type may have a horizontal field of view of any value greater than or equal to 300 degrees (e.g., 360 degrees). The horizontal field of view of the second set of sensors of the first type may be any value less than 120 degrees, or any value between 20 and 80 degrees, or any value between 30 and 50 degrees. The horizontal field of view of the third set of sensors of the first type may be any value between 10 and 40 degrees, or any value between 15 and 25 degrees.

Figure 7:
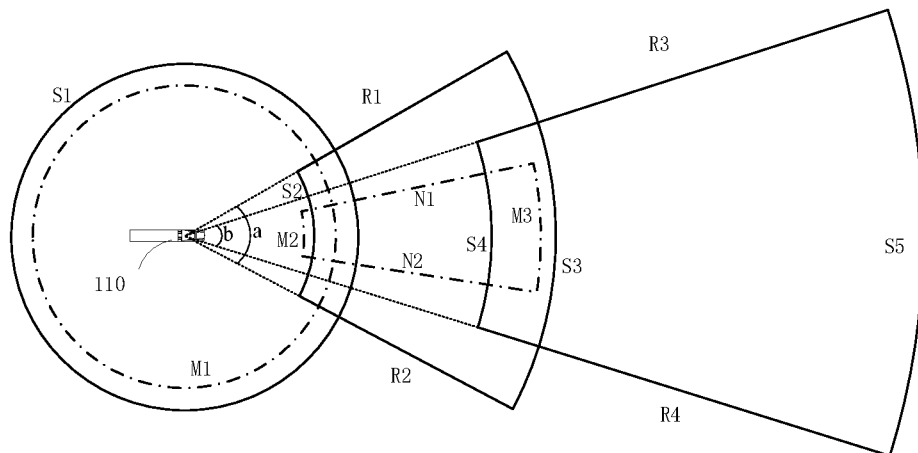
FIG. 7 shows horizontal sensing ranges of sensors according to an example embodiment.

FIG. 7 illustrates horizontal sensing ranges for multiple sets of sensors of multiple sensor units of an exemplary sensor master system. In the example of FIG. 7, the horizontal sensing range of the first set of sensors of the first type is defined by a circle S1 on the center of which the vehicle 110 is located. It can be seen from FIG. 7 that the horizontal field of view of the first set of sensors of the first type is 360 degrees. The distance from the circle S1 to the vehicle 110 is the maximum sensing distance of the first set of sensors of the first type. The minimum sensing distance of the first set of sensors of the first type is 0. The distance from an arc S2 to the vehicle 110 is the minimum sensing distance of the second set of sensors of the first type. The distance from an arc S3 to the vehicle 110 is the maximum sensing distance of the second set of sensors of the first type. The horizontal sensing range of the second set of sensors of the first type is defined by the arc S2, the arc S3, a line segment R1 and a line segment R2. The included angle a of the extensions of the line segment R1 and the line segment R2 (represented by the dashed line in FIG. 7) constitutes the horizontal field of view of the second set of sensors of the first type. The distance from an arc S4 to the vehicle 110 is the minimum sensing distance of the third set of sensors of the first type. The distance from an arc S5 to the vehicle 110 is the maximum sensing distance of the third set of sensors of the first type. The horizontal sensing range of the third set of sensors of the first type is defined by the arc S4, the arc S5, a line segment R3 and a line segment R4. The included angle b between the extensions of the line segment R3 and the line segment R4 (indicated by the dashed line in FIG. 7) constitutes the horizontal field of view of the third set of sensors of the first type.

Figure 9:
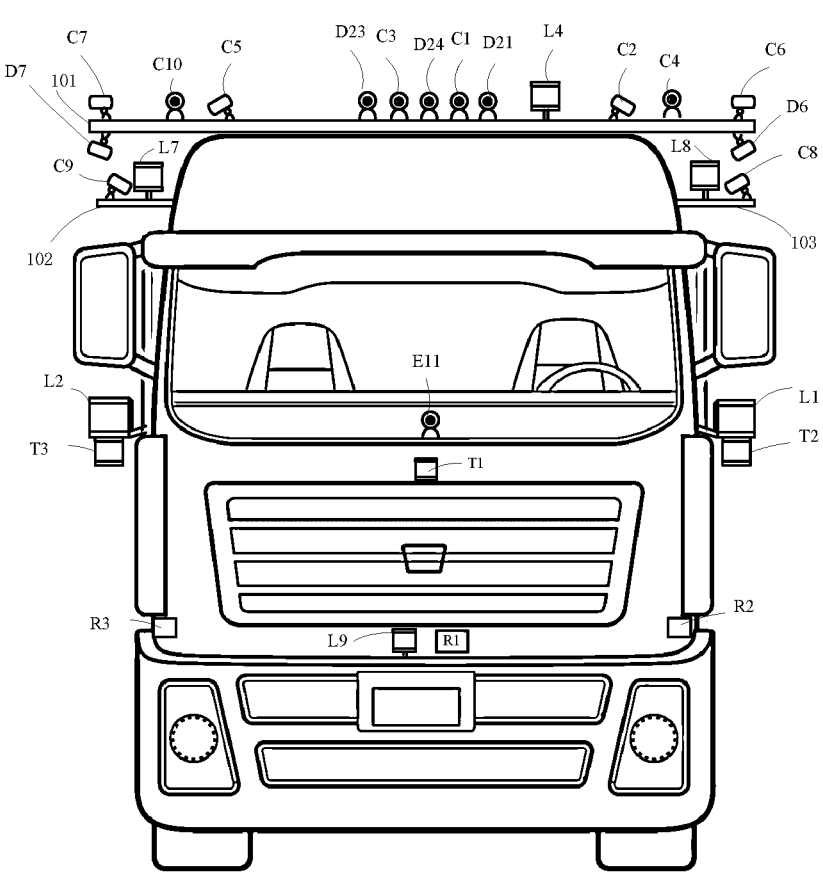
FIG. 9 is a front view of the vehicle showing a schematic view of a sensor arrangement as viewed from the front of the vehicle in the example.
Figure 10:
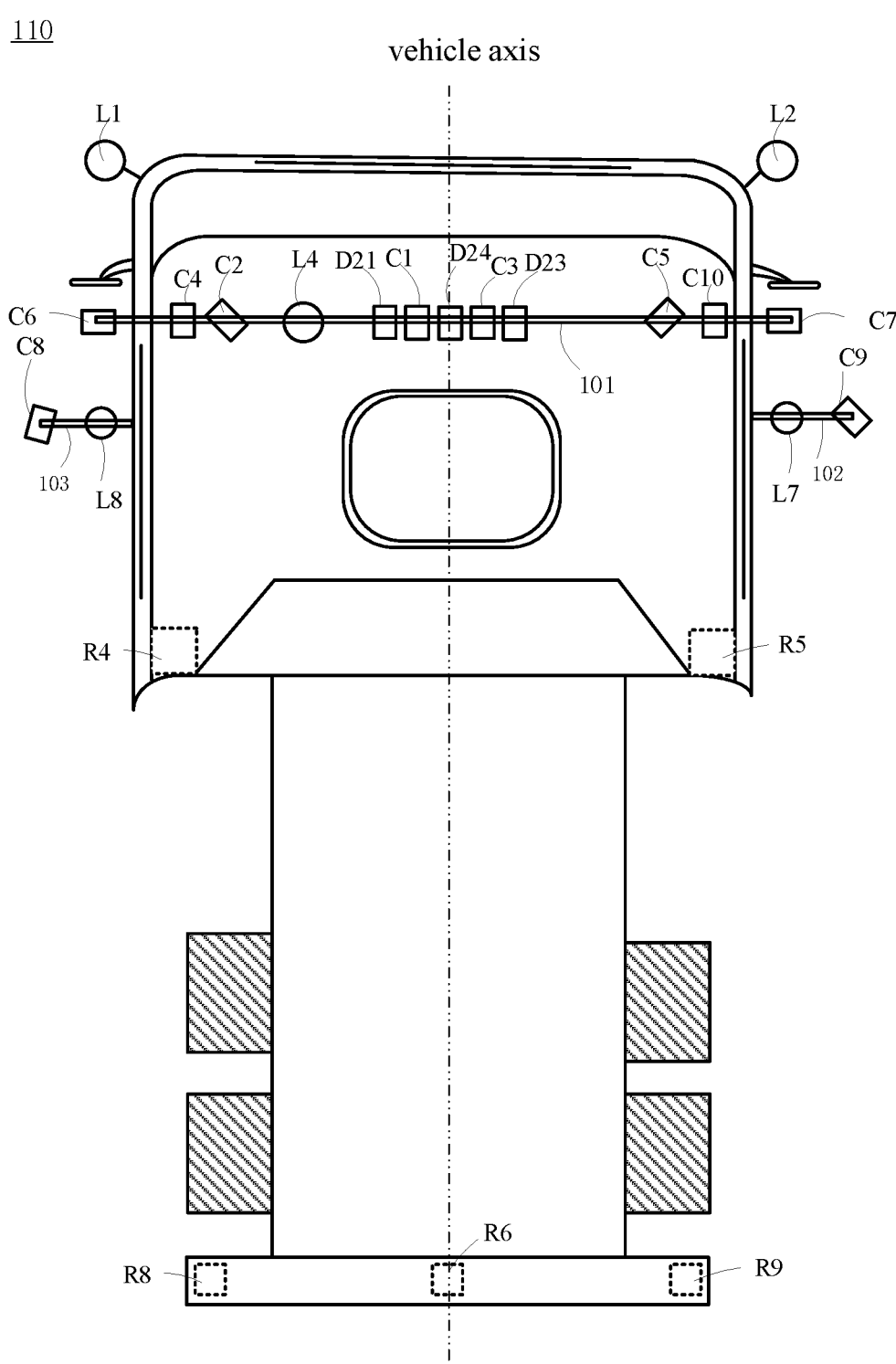
FIG. 10 is a top view of the vehicle showing a schematic view of the sensor arrangement as viewed from above the vehicle in the example.

FIGS. 9 and 10 show one specific example of the sensor arrangement as viewed from the front and above, respectively, of the vehicle 110. Referring to FIGS. 9 and 10, a first set of sensors of the first type of the sensor master system includes a plurality of cameras, for example, cameras C1, C2, C5, C6, C7 on a bracket 101 of a vehicle roof. The camera C1 is oriented toward the front of the vehicle (i.e., in a direction parallel to the vehicle axis) so as to have a field of view in front of the vehicle 110. The camera C2 is oriented toward the front left of the vehicle (i.e., in a direction having an included angle with the vehicle axis) so as to have a field of view in front left of the vehicle 110. The camera C5 is oriented toward the front right of the vehicle (i.e., in a direction having an included angle with the vehicle axis) so as to have a field of view in the front right of vehicle 110. The camera C6 is oriented toward the left side of the vehicle (i.e., in a direction perpendicular to the vehicle axis) so as to have a field of view on the left side of the vehicle 110. The camera C7 is oriented toward the right side of the vehicle (i.e., a direction perpendicular to the vehicle axis) so as to have a field of view at the right side of the vehicle 110.

The first set of sensors of the first type of the sensor master system further includes a camera C8 and a camera 9 on the bracket 103 and the bracket 102. The camera C8 is oriented toward the left rear of the vehicle (i.e. in a direction having an included angle with the vehicle axis) so as to have a field of view at the left rear of the vehicle 110. The camera C9 is oriented toward the right rear of the vehicle (i.e. in a direction having an included angle with the vehicle axis) so as to have a field of view at the right rear of the vehicle 110.

The cameras C1, C2, C5, C6, C7, C8, and C9 may have a horizontal field of view equal to 360 degrees, or any value close to 360 degrees (e.g., any value greater than 300 degrees) in combination due to the arrangement described above. The maximum sensing distance of the cameras in combination is any value between 100 and 300 meters, or between 100 and 200 meters, or between 200 and 300 meters. The minimum sensing distance of the cameras in combination can be any value between 0 and 10 meters.

Referring to FIGS. 9 and 10, a second set of sensors of the first type of the sensor master system includes at least one camera, such as a camera C3 disposed on a bracket 110 of the vehicle roof, with camera C3 facing the front of the vehicle so as to have a field of view in front of the vehicle 110. The maximum sensing distance of camera C3 is any value between 400 and 600 meters, or between 400 and 500 meters, or between 500 and 600 meters. The minimum sensing distance of camera C3 is any value between 100 and 300 meters, or between 100 and 200 meters, or between 200 and 300 meters. The horizontal field of view of camera C3 may be any value between 20 and 80 degrees, or any value between 30 and 50 degrees.

With reference to FIGS. 9 and 10, a third set of sensors of the first type of the sensor master system includes at least two cameras, for example a camera C4 and a camera C10 arranged on a bracket 101 of the vehicle roof. The cameras C4 and C10 face the front of the vehicle so as to have a field of view in front of the vehicle 110. The cameras C4 and C10 may form a binocular system. The distance (i.e., the baseline length) between the camera C4 and the camera C10 may be more than 1 meter, or more than 1.5 meters, or more than 2 meters. The maximum sensing distance of the binocular system consisting of the cameras C4 and C10 may be any value between 700 and 1500 meters, or between 800 and 1200 meters, or between 900 and 1100 meters. The minimum sensing distance of the binocular system consisting of the cameras C4 and C10 may be any value between 400 and 600 meters, or between 400 and 500 meters, or between 500 and 600 meters. The horizontal field of view of the binocular system consisting of the cameras C4 and C10 may be any value between 10 and 40 degrees, or any value between 15 and 25 degrees.

Environmental perception of the vehicle 110 in most situations can be achieved by using the first sensor unit (e.g., camera unit) described above. In addition to the first sensor unit, the vehicle 110 sensor master system may also include a second sensor unit (e.g., a LIDAR unit) for redundancy or as a supplement (to enable environmental sensing in some complex situations). The second sensor unit of the sensor master system may include a first set of sensors (i.e., a first set of sensors of the second type) configured for sensing objects within a fourth horizontal sensing range relative to the vehicle. The fourth horizontal sensing range is determined by the horizontal field of view, the maximum sensing distance and the minimum sensing distance of the first set of sensors of the second type.

The second sensor unit of the sensor master system may further include a second set of sensors (i.e., a second set of sensors of the second type) configured for sensing objects within a fifth horizontal sensing range relative to the vehicle. The fifth horizontal sensing range is determined by the horizontal field of view, the maximum sensing distance and the minimum sensing distance of the second set of sensors of the second type.

The maximum sensing distance of the first set of sensors of the second type may be greater than or equal to the minimum sensing distance of the second set of sensors of the second type and less than the maximum sensing distance of the second set of sensors of the second type. The maximum sensing distance of the second set of sensors of the second type is greater than the maximum sensing distance of the first set of sensors of the second type. The maximum sensing distance of the first set of sensors of the first type may be greater than or equal to the maximum sensing distance of the first set of sensors of the second type. The maximum sensing distance of the second set of sensors of the first type may be greater than or equal to the maximum sensing distance of the second set of sensors of the second type.

In some embodiments, the horizontal sensing ranges of the second sensor unit of the sensor master system and the first sensor unit of the sensor master system overlap to a large extent, thereby facilitating the sensing of environmental information around the vehicle under various environmental conditions. For example, the overlap of the horizontal sensing ranges of the second sensor unit and the first sensor unit is at least 80% (or at least 90%, and may even be 100%) of the horizontal sensing range of one of the second sensor unit and the first sensor unit, such as the second sensor unit. It should be noted that reference to the percentage of the sensing range in this application refers to the percentage of the area of the sensing range.

In some embodiments, the overlap of the horizontal sensing ranges of the second sensor unit and the first sensor unit is at least 80% (or at least 90%, and even 100%) of the horizontal sensing range of the second sensor unit, but not more than 60% (or not more than 70%, or not more than 80%) of the horizontal sensing range of the first sensor unit. According to the present application, on the one hand, the horizontal sensing range of the second sensor unit partially overlaps the horizontal sensing range of the first sensor unit to provide redundancy. On the other hand by making the horizontal sensing range of the second sensor unit smaller than the horizontal sensing range of the first sensor, it is possible to save the number of sensors to meet the limited power supply on the vehicle.

In some embodiments, the overlap of the horizontal sensing ranges of the first set of sensors of the second type and the first set of sensors of the first type is at least 80% (or at least 90%, and may even be 100%) of the horizontal sensing range of one of the first set of sensors of the second type and the first set of sensors of the first type (e.g., the first set of sensors of the second type). In some embodiments, the overlap of the horizontal sensing ranges of the second set of sensors of the second type and the second set of sensors of the first type is at least 80% (or at least 90%, and may even be 100%) of the horizontal sensing range of one of the second set of sensors of the second type and the second set of sensors of the first type (e.g., the second set of sensors of the second type).

The maximum sensing distance of the first set of sensors of the second type is any value between 100 and 300 meters, or between 100 and 200 meters, or between 200 and 300 meters. The minimum sensing distance of the first set of sensors of the second type may be any value between 0 and 10 meters. The maximum sensing distance of the second set of sensors of the second type is any value between 400 and 600 meters, or between 400 and 500 meters, or between 500 and 600 meters. The minimum sensing distance of the second set of sensors of the second type is any value between 100 and 300 meters, or between 100 and 200 meters, or between 200 and 300 meters.

In some embodiments, the horizontal field of view of the second set of sensors of the second type is less than or equal to the horizontal field of view of the first set of sensors of the second type. In some embodiments, the horizontal field of view of the first set of sensors of the second type is equal to the horizontal field of view of the first set of sensors of the first type. In some embodiments, the first set of sensors of the second type has a horizontal field of view of any value greater than or equal to 300 degrees (e.g., 360 degrees). The horizontal field of view of the second set of sensors of the second type may be less than or equal to the horizontal field of view of the second set of sensors of the first type. In some embodiments, the horizontal field of view of the second set of sensors of the second type may be any value less than 90 degrees, or any value between 5 and 30 degrees, or any value between 10 and 20 degrees.

Referring to FIG. 7, the horizontal sensing range of the sensors of the second type is indicated by a dotted line. The horizontal sensing range of the first set of sensors of the second type is defined by a circle M1. The horizontal field of view thereof is 360 degrees. The distance from the circle M1 to the vehicle 110 is the maximum sensing distance of the first set of sensors of the second type. The minimum sensing distance of the first set of sensors of the second type is 0. The vehicle is located on the center of the circle M1. The distance from the arc M2 to the vehicle 110 is the minimum sensing distance of the second set of sensors of the second type. The distance from the arc M3 to the vehicle 110 is the maximum sensing distance of the second set of sensors of the second type. The horizontal sensing range of the second set of sensors of the second type is defined by the arc M2, the arc M3, the line segment N1, and the line segment N2. The included angle between the extensions of the line segment N1 and the line segment N2 (not shown in FIG. 7) constitutes the horizontal field of view of the second set of sensors of the second type.

Referring to FIGS. 9 and 10, a first set of sensors of the second type of the sensor master system includes at least two LIDARs, for example, a 360-degree rotary LIDAR L1 and a 360-degree rotary LIDAR L2 provided at two junctions between the front of the vehicle and the left and right sides of the vehicle, respectively, the L1 being capable of covering a perception of a 270-degree range on the left and front sides of the vehicle, and the L2 being capable of realizing a perception of a 270-degree range on the right and front sides of the vehicle.

The maximum sensing distance of LIDARs L1 and L2 is any value between 100 and 300 meters, or between 100 and 200 meters, or between 200 and 300 meters. The LIDARs L1 and L2 in combination may have a horizontal field of view of 360 degrees, or any value close to 360 degrees (e.g., any value greater than 300 degrees).

Although the combination of the LIDARs L1 and L2 can achieve a 360 degree horizontal field of view, in the case where the vertical field of view of the LIDARs L1 and L2 is less than 180 degrees, there is a blind area beyond the vertical field of view of the LIDARs L1 and L2 near the vehicle where the LIDARs L1 and L2 do not sense. For this reason, the first set of sensors of the second type of the sensor master system further include 360 degree rotary LIDARs L7 and L8 disposed on the brackets 102 and 103 near the top on both sides of the vehicle, and a 360 degree rotary LIDAR L9 disposed at a middle position in front of the vehicle. The maximum sensing distance of each of LIDARs L7, L8, and L9 is any value between 30 and 50 meters. The minimum sensing distance may be 0 meters.

A second set of sensors of the second type of the sensor master system may include at least one LIDAR, for example a LIDAR L4 mounted on the bracket 101 towards the front of the vehicle so as to have a field of view in front of the vehicle 110. The maximum sensing distance of LIDAR L4 is any value between 400 and 600 meters, or between 400 and 500 meters, or between 500 and 600 meters. The minimum sensing distance of LIDAR L4 is any value between 100 and 300 meters, or between 100 and 200 meters, or between 200 and 300 meters. The horizontal field of view of LIDAR L4 may be any value between 5 and 30 degrees, or any value between 10 and 20 degrees.

Environmental perception of the vehicle 110 in most situations can be achieved by using the first sensor unit (e.g., camera unit) and the second sensor unit (e.g., LIDAR unit) described above. The sensor master system of the vehicle 110 may also include a millimeter wave radar unit and/or an ultrasonic radar unit for redundancy or as a supplement (to enable environmental sensing in some complex situations).

The millimeter wave radar unit may include a first set of millimeter wave radars mounted in front of the vehicle. In some implementations, the first set of millimeter wave radars includes at least one millimeter wave radar in the middle of the front of the vehicle. For example, in the examples of FIGS. 9 and 10, the millimeter wave radar R1 in the middle of the front of the vehicle is included in the first set of millimeter wave radars.

The millimeter wave radar unit may further include a second set of millimeter wave radars including at least two millimeter wave radars installed at both sides of the front of the vehicle, at least two millimeter wave radars installed at both sides of the rear of the cab of the vehicle, and at least one millimeter wave radar installed at an intermediate position in the rear of the vehicle. For example, in the examples of FIGS. 9 and 10, the second set of millimeter wave radars includes two millimeter wave radars R2 and R3 installed directly below the LIDARs L1 and L2, respectively, a millimeter wave radar R4 and a millimeter wave radar R5 on the left and right sides of the rear of the cab of the vehicle, and a millimeter wave radar R6 in the middle of the rear of the vehicle.

The millimeter wave radar unit 203 may further include a third set of millimeter wave radars that include at least two millimeter wave radars installed on both sides of the rear of the vehicle, for example, a millimeter wave radar R8 and a millimeter wave radar R9 installed on both sides of the rear of the vehicle.

The maximum sensing distance of each millimeter wave radar may be any value between 60 and 120 meters or any value between 80 and 100 meters. The minimum sensing distance may be any value between 0 and 40 meters or any value between 20 and 40 meters.

The ultrasonic radar unit may include a plurality of ultrasonic radars located at the front, the sides and the rear of the vehicle. The plurality of ultrasonic radars located at the front, the sides and the rear of the vehicle surrounding the vehicle, and may sense environmental information around the vehicle. The maximum sensing distance of each ultrasonic radar may be any value between 2 and 10 meters or between 4 and 6 meters, and the minimum sensing distance of each ultrasonic radar may be any value between 0 and 2 meters.

According to embodiments of the present application, redundancy can be achieved not only between different types of sensors (or different sensor units) of the same sensor subsystem (e.g., a sensor master system), but also between different sensor subsystems (e.g., a sensor slave system and a sensor master system, or a sensor backup system, a sensor slave system and a sensor master system) by rationalizing the arrangement of sensors on the vehicle.

Sensor Slave System

The sensor arrangement of the sensor master system is described above, and the sensor arrangement of the sensor slave system is described next. A first sensor unit (e.g., a camera unit) of the sensor slave system may include a first set of sensors (i.e., a first set of sensors of the first type), the first set of sensors of the first type being configured for sensing objects within a sixth horizontal sensing range relative to the vehicle. The sixth horizontal sensing range is determined by the horizontal field of view, the maximum sensing distance and the minimum sensing distance of the first set of sensors of the first type. The sixth horizontal sensing range may be the same as or within the horizontal sensing range (i.e., the first horizontal sensing range) of the first set of sensors of the first type of the sensor master system.

In some embodiments, the sixth horizontal sensing range includes at least two portions, a forward horizontal sensing range (also referred to as a forward portion) and a backward horizontal sensing range (also referred to as a backward portion), each of the forward and backward portions being fan-shaped. The first set of sensors of the first type has a forward maximum sensing distance, a forward minimum sensing distance, and a forward horizontal field of view for a forward horizontal sensing range. The first set of sensors of the first type has a backward maximum sensing distance, a backward minimum sensing distance, and a backward horizontal field of view for a backward horizontal sensing range.

The first sensor unit of the sensor slave system may further include a second set of sensors (i.e., a second set of sensors of the first type) configured for sensing objects within a seventh horizontal sensing range relative to the vehicle. The seventh horizontal sensing range is determined by the horizontal field of view, the minimum sensing distance and the maximum sensing distance of the second set of sensors of the first type. The seventh horizontal sensing range may be the same as the horizontal sensing range of the second set of sensors of the first type of the sensor master system (i.e., the second horizontal sensing range) or fall within the second horizontal sensing range.

The first sensor unit of the sensor slave system may further include a third set of sensors (i.e. a third set of sensors of the first type) configured for sensing objects within an eighth horizontal sensing range relative to the vehicle. The eighth horizontal sensing range is determined by the horizontal field of view, the minimum sensing distance and the maximum sensing distance of the third set of sensors of the first type. The eighth horizontal sensing range may be the same as the horizontal sensing range of the third set of sensors of the first type of the sensor master system (i.e., the third horizontal sensing range) or fall within the third horizontal sensing range.

The maximum sensing distance (or forward maximum sensing distance and backward maximum sensing distance) of the first set of sensors of the first type of the sensor slave system is greater than or equal to the minimum sensing distance of the second set of sensors of the first type and less than the minimum sensing distance of the third set of sensors of the first type and the maximum sensing distance of the second set of sensors of the first type. The maximum sensing distance of the second set of sensors of the first type is greater than or equal to the minimum sensing distance of the third set of sensors of the first type and greater than the maximum sensing distance of the first set of sensors of the first type (or the forward maximum sensing distance and the backward maximum sensing distance). The minimum sensing distance of the third set of sensors of the first type is greater than the minimum sensing distance of the second set of sensors of the first type. The maximum sensing distance of the third set of sensors of the first type is greater than the maximum sensing distance of the second set of sensors of the first type.

In some embodiments, the maximum sensing distance (or forward and backward maximum sensing distances) of the first set of sensors of the first type of the sensor slave system may be any value between 100 and 300 meters, or any value between 100 and 200 meters, or any value between 200 and 300 meters. The minimum sensing distance (or forward and backward minimum sensing distance) of the first set of sensors of the first type may be any value between 0 and 10 meters.

The maximum sensing distance of the second set of sensors of the first type of the sensor slave system is any value between 400 and 600 meters, or between 400 and 500 meters, or between 500 and 600 meters. The minimum sensing distance of the second set of sensors of the first type is any value between 100 and 300 meters, or between 100 and 200 meters, or between 200 and 300 meters. The maximum sensing distance of the third set of sensors of the first type may be any value between 700 and 1500 meters, or between 800 and 1200 meters, or between 900 and 1100 meters. The minimum sensing distance of the third set of sensors of the first type may be any value between 400 and 600 meters, or between 400 and 500 meters, or between 500 and 600 meters.

In some embodiments, the horizontal field of view of the second set of sensors of the first type of the sensor slave system is less than or equal to the horizontal field of view of the first set of sensors of the first type (or the forward horizontal field of view of the first set of sensors of the first type). The horizontal field of view of the third set of sensors of the first type is less than or equal to the horizontal field of view of the second set of sensors of the first type. The first set of sensors of the first type may have a forward horizontal field of view of any value between 30 and 90 degrees, or any value between 40 and 80 degrees, or any value between 50 and 70 degrees. The first set of sensors of the first type may have a backward horizontal field of view of any value between 60 and 180 degrees, or any value between 90 and 150 degrees, or any value between 100 and 130 degrees. The horizontal field of view of the second set of sensors of the first type may be any value less than 120 degrees, or any value between 20 and 80 degrees, or any value between 30 and 50 degrees. The horizontal field of view of the third set of sensors of the first type may be any value between 10 and 40 degrees, or any value between 15 and 25 degrees.

Figure 8:
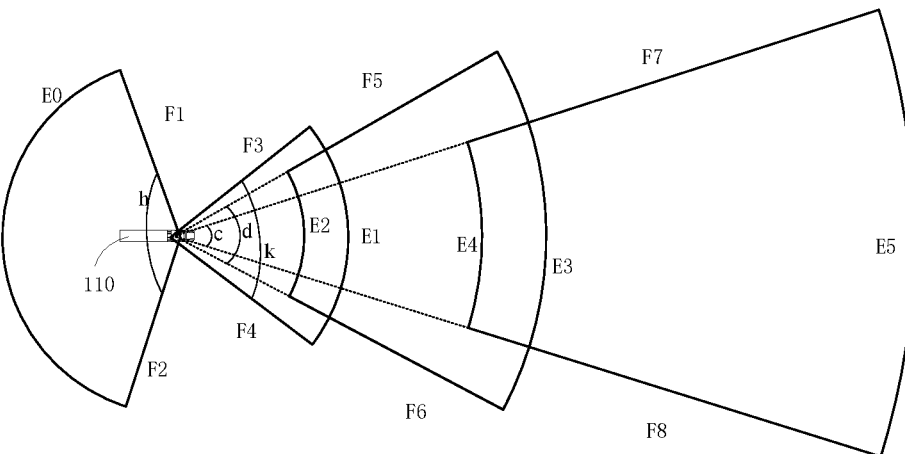
FIG. 8 shows horizontal sensing ranges of sensors according to another example embodiment.

FIG. 8 shows the horizontal sensing range of an exemplary sensor from multiple sets of sensors of a first sensor unit of the sensor slave system. In the example of FIG. 8, the horizontal sensing range of the first set of sensors of the first type consists of two portions, a forward portion and a backward portion, the backward portion being defined by a sector formed by the line segments F1 and F2 and the arc E0, and the forward portion being defined by a sector formed by the line segments F3 and F4 and the arc E1. The horizontal field of view of the forward portion is represented by an included angle k and the horizontal field of view of the backward portion is represented by an included angle h. The distance from the arc E1 to the vehicle 110 is the maximum sensing distance for the forward portion. The distance from the arc E0 to the vehicle 110 is the maximum sensing distance for the backward portion. The minimum sensing distance from the forward portion and the backward portion is zero.

The distance from the arc E2 to the vehicle 110 is the minimum sensing distance of the second set of sensors of the first type. The distance from the arc E3 to the vehicle 110 is the maximum sensing distance of the second set of sensors of the first type. The horizontal sensing range of the second set of sensors of the first type is defined by the arc E2, the arc E3, the line segment F5 and the line segment F6. The included angle d of the extensions of the line segment F5 and the line segment F6 (represented by dashed lines in FIG. 8) constitutes the horizontal field of view of the second set of sensors. The distance from the arc E4 to the vehicle 110 is the minimum sensing distance of the third set of sensors of the first type. The distance from the arc E5 to the vehicle 110 is the maximum sensing distance of the third set of sensors of the first type. The horizontal sensing range of the third set of sensors of the first type is defined by the arc E4, the arc E5, the line segment F7 and the line segment F8. The included angle c of the extensions of the line segment F7 and the line segment F8 (represented by dashed lines in FIG. 8) constitutes the horizontal field of view of the third set of sensors.

In some embodiments, the horizontal sensing ranges of the sensor units of the sensor slave system and the sensor units of the sensor master system overlap to a large extent, forming redundancy, thereby facilitating the sensing of environmental information around the vehicle under various environmental conditions. For example, the overlap of the horizontal sensing ranges of the first set of sensors of the first type of the sensor slave system and the first set of sensors of the first type of the sensor master system is at least 50% of the horizontal sensing range of one of the first set of sensors of the first type of the sensor slave system and the first set of sensors of the first type of the sensor master system, or at least 80% of the horizontal sensing range of one of the first set of sensors of the first type of the sensor slave system and the first set of sensors of the first type of the sensor master system.

In some embodiments, the overlap of the horizontal sensing ranges of the first set of sensors of the first type of the sensor slave system and the horizontal sensing range of the first set of sensors of the first type of the sensor master system is at least 30%, but not more than 70%, of the horizontal sensing range of the first set of sensors of the first type of the sensor master system. In some embodiments, the overlap of the horizontal sensing ranges of the first set of sensors of the first type of the sensor slave system and the horizontal sensing range of the first set of sensors of the first type of the sensor master system is at least 40%, but not more than 60%, of the horizontal sensing range of the first set of sensors of the first type of the sensor master system. According to the present application, the horizontal sensing range of the sensor slave system may be smaller than the horizontal sensing range of the sensor master system, which may save the number of sensors to meet the limited power supply on the vehicle.

In some embodiments, the overlap of the horizontal sensing ranges of the second set of sensors of the first type of the sensor slave system and the second set of sensors of the first type of the sensor master system is at least 80% (or at least 90%, and may even be 100%) of the horizontal sensing range of one of the second set of sensors of the first type of the sensor slave system and the second set of sensors of the first type of the sensor master system. The overlap of the horizontal sensing ranges of the third set of sensors of the first type of the sensor slave system and the third set of sensors of the first type of the sensor master system is at least 80% (or at least 90%, and may even be 100%) of the horizontal sensing range of one of the third set of sensors of the first type of the sensor slave system and the third set of sensors of the first type of the sensor master system. The overlap of the horizontal sensing ranges of the first set of sensors of the second type of the sensor slave system and the first set of sensors of the second type of the sensor master system is at least 80% (or at least 90%, and may even be 100%) of the horizontal sensing range of one of the first set of sensors of the second type of the sensor slave system and the first set of sensors of the second type of the sensor master system.

Referring to FIGS. 9 and 10, the first set of sensors of the first type of the sensor slave system include a plurality of cameras, e.g. cameras D6, D7, D21 on the bracket 101 of the vehicle roof. The camera D21 is directed towards the front of the vehicle (i.e., a direction parallel to the vehicle axis) so as to have a field of view in front of the vehicle 110. The camera D6 is directed to the left rear of the vehicle (i.e., in a direction having an included angle with the vehicle axis) so as to have a field of view at the left rear of the vehicle 110. The camera D7 is directed towards the right rear of the vehicle (i.e., in a direction having an included angle with the vehicle axis) so as to have a field of view at the right rear of the vehicle 110.

The cameras D6, D7, D21 each have a maximum sensing distance of any value between 100 and 300 meters, or between 100 and 200 meters, or between 200 and 300 meters. The minimum sensing distance of each of the cameras D6, D7, D21 may be any value between 0 and 10 meters. The horizontal field of view of camera D21 is any value between 30 and 90 degrees, or between 40 and 80 degrees, or between 50 and 70 degrees. The combined horizontal field of view of cameras D6, D7 is any value between 60 and 180 degrees, or between 90 and 150 degrees, or between 100 and 130 degrees.

Referring to FIGS. 9 and 10, a second set of sensors of the first type of the sensor slave system includes at least one camera, for example, a camera D23 arranged on a bracket 101 on the roof of the vehicle. The camera D23 faces the front of the vehicle so as to have a field of view in front of the vehicle 110. The maximum sensing distance of camera D23 is any value between 400 and 600 meters, or between 400 and 500 meters, or between 500 and 600 meters. The minimum sensing distance of camera D23 is any value between 100 and 300 meters, or between 100 and 200 meters, or between 200 and 300 meters. The horizontal field of view of camera D23 may be any value between 20 and 80 degrees, or any value between 30 and 50 degrees.

With reference to FIGS. 9 and 10, the third set of sensors of the first type of the sensor slave system include at least one camera, for example, a camera D24 arranged on the bracket 101 of the vehicle roof. The camera D24 is directed towards the front of the vehicle so as to have a field of view in front of the vehicle 110. The maximum sensing distance of the camera D24 may be any value between 700 and 1500 meters, or between 800 and 1200 meters, or between 900 and 1100 meters. The minimum sensing distance of camera D24 may be any value between 400 and 600 meters, or any value between 400 and 500 meters, or any value between 500 and 600 meters. The horizontal field of view of D24 can be any value between 10 and 40 degrees, or any value between 15 and 25 degrees.

Environmental perception of the sensor slave system of the vehicle 110 in most situations can be achieved by using the first sensor unit (e.g., camera unit) of the sensor slave system described above. In addition to the first sensor unit, the sensor slave system of the vehicle 110 may also include a second sensor unit (e.g., a LIDAR unit) for redundancy or as a supplement (to enable environmental sensing in some complex situations). The second sensor unit of the sensor slave system may include a first set of sensors (i.e., a first set of sensors of the second type) configured for sensing objects within a ninth horizontal sensing range relative to the vehicle. The ninth horizontal sensing range is determined by the horizontal field of view, the maximum sensing distance and the minimum sensing distance of the first set of sensors of the second type.

In some embodiments, the horizontal sensing ranges of the second sensor unit of the sensor slave system and the first sensor unit of the sensor slave system overlap with each other to a large extent, forming redundancy, thereby facilitating the sensing of environmental information around the vehicle under various environmental conditions. For example, the overlap of the horizontal sensing ranges of the second sensor unit and the first sensor unit is at least 30%, but not more than 70%, of the horizontal sensing range of one of the second sensor unit and the first sensor unit, such as the second sensor unit. Alternatively, the overlap of the horizontal sensing ranges of the second sensor unit and the first sensor unit is at least 40%, but not more than 60%, of the horizontal sensing range of one of the second sensor unit and the first sensor unit, such as the second sensor unit.

In some embodiments, the overlap of the horizontal sensing ranges of the first set of sensors of the second type and the first set of sensors of the first type of the sensor slave system is at least 50% of the horizontal sensing range of one of the first set of sensors of the second type and the first set of sensors of the first type (e.g., the first set of sensors of the second type). In some embodiments, the overlap of the horizontal sensing ranges of the first set of sensors of the second type and the first set of sensors of the first type of the sensor slave system is at least 30% of the horizontal sensing range of the first set of sensors of the second type, but not more than 70% of the horizontal sensing range of the first set of sensors of the second type. In some embodiments, the overlap of the horizontal sensing ranges of the first set of sensors of the second type and the first set of sensors of the first type of the sensor slave system is at least 40% of the horizontal sensing range of the first set of sensors of the second type, but not more than 60% of the horizontal sensing range of the first set of sensors of the second type.

The maximum sensing distance of the first set of sensors of the second type of the sensor slave system is any value between 100 and 300 meters, or any value between 100 and 200 meters, or any value between 200 and 300 meters. The minimum sensing distance of the first set of sensors of the second type may be any value between 0 and 10 meters. In some embodiments, the first set of sensors of the second type has a horizontal field of view of any value greater than or equal to 300 degrees (e.g., 360 degrees).

Referring to FIG. 9, the first set of sensors of the second type of the sensor slave system includes a plurality of LIDARs, for example, LIDARs T2 and T3 respectively provided at two junctions between the front of the vehicle and the left and right sides of the vehicle, and a LIDAR T1 provided on the front side of the vehicle. Each of the horizontal field of views of the LIDARs T1, T2 and T3 may be any value greater than or equal to 120 degrees. The combined horizontal field of views of the three LIDARs may be 360 degrees, or any value close to 360 degrees (for example, any value greater than 300 degrees. The maximum sensing distance of LIDARs T1, T2, and T3 is any value between 100 and 300 meters, or between 100 and 200 meters, or between 200 and 300 meters. The minimum sensing distance of LIDARs T1, T2, and T3 may be any value between 0 and 10 meters.

Sensor Backup System

The sensor arrangement of the sensor master system and slave system is described above, and the sensor arrangement of the sensor backup system is described next. The sensor backup system may include at least one sensor unit. Each sensor unit may include at least one set of sensors, and each set may include at least one sensor. In some embodiments, the sensor backup system includes only one sensor unit (e.g., camera unit), which may include only one set of sensors. The set of sensors is configured for sensing objects within a tenth horizontal sensing range relative to the vehicle. The tenth horizontal sensing range is determined by the horizontal field of view, the maximum sensing distance and the minimum sensing distance of the set of sensors. The maximum sensing distance of the set of sensors is any value between 100 and 300 meters, or between 100 and 200 meters, or between 200 and 300 meters. The minimum sensing distance may be any value between 0 and 10 meters. The horizontal field of view of the set of sensors is any value between 30 and 90 degrees, or between 40 and 80 degrees, or between 50 and 70 degrees.

In some embodiments, the horizontal sensing ranges of the sensor unit of the sensor backup system and the first sensor unit of the sensor slave system or sensor master system overlap to a large extent, forming redundancy, thereby facilitating the sensing of environmental informa- tion around the vehicle under various environmental condi- tions. For example, the overlap of the horizontal sensing ranges of the sensor unit of the sensor backup system and the first sensor unit of the sensor slave or master system is at least 80% of the horizontal sensing range of the sensor unit of the sensor backup system (or at least 90% of the hori- zontal sensing range of the sensor unit of the sensor backup system), but not more than 40% of the horizontal sensing range of the first sensor unit of the sensor master system (or not more than 50% of the horizontal sensing range of the first sensor unit of the sensor slave system).

Referring to FIG. 9, the sensor backup system may include at least one camera, for example, a camera E11 arranged at the front of the vehicle. The camera E11 is positioned towards the front of the vehicle, and may be configured to have a field of view in front of the vehicle. The maximum sensing distance of the camera E11 is any value between 100 and 300 meters, or between 100 and 200 meters, or between 200 and 300 meters. The minimum sensing distance may be any value between 0 and 10 meters. The horizontal field of view of the camera E11 may be any value between 30 and 90 degrees, or between 40 and 80 degrees or between 50 and 70 degrees.

The sensor arrangements of the sensor master system, the sensor slave system and the sensor backup system are described one by one above. In accordance with the present application, by appropriate coordination of cameras, LIDARs, millimeter wave radars, and/or ultrasonic radars, a variety of different environments may be accommodated for each sensor subsystem, and appropriate redundancy is pro- vided to reliably sense environmental information around the vehicle 110 in a variety of travel environments. In addition, by dividing each type of sensor into a plurality of sets, each set having a different field of view and different sensing distance, it can minimize the number of sensors while ensuring reliable sensing.

In this application, the forward direction of the vehicle refers to a direction almost parallel to the axis of the vehicle or the forward traveling direction (the direction in which the vehicle travels straight ahead). The axis of the vehicle along which the vehicle is substantially symmetrical to the left and right is shown in FIG. 10.

Although in FIGS. 9 and 10 the bracket 102 and the bracket 103 are located on both sides of the vehicle near the roof. Those skilled in the art will appreciate that the bracket 102 and the bracket 103 may be located in other positions. For example, the bracket 102 and the bracket 103 may be located on the roof. In one example, the bracket 102 and the bracket 103 are located on a position of the roof closer to the rear of the vehicle than the bracket 101. The bracket 102 and the bracket 103 may merge into the same bracket when located on the roof. In addition, those skilled in the art will also appreciate that some of the sensors on bracket 102 and bracket 103 may be mounted on bracket 101, and some of the sensors on bracket 101 may also be mounted on the bracket 102 and the bracket 103.

According to some embodiments of the present applica- tion, a trailer, a semi-trailer, a hanging box or a hanging plate is further connected to the rear of the tractor. It may further include an included angle sensing unit, which may include at least one of a single-line LIDAR, a multi-line LIDAR and a mechanical encoder arranged among the tractor and the trailer, the semi-trailer, the hanging box or the hanging plate.

Although embodiments or examples of the present dis- closure have been described with reference to the accom- panying drawings, it should be understood that the above- described methods, systems and apparatuses are merely exemplary embodiments or examples. The scope of the present invention is not limited by these embodiments or examples, but is defined only by the appended claims and their equivalents. Various elements of the embodiments or examples may be omitted or replaced with equivalents thereof. Furthermore, steps may be performed in an order other than that described in this disclosure. Further, various elements of the embodiments or examples may be combined in various ways. Importantly, as technology evolves, many of the elements described herein can be replaced with equivalent elements that emerge from this disclosure.

What is claimed is:

1. A vehicle, comprising:

a sensor system comprising:

a first sensor subsystem configured for acquiring envi- ronmental information around the vehicle; and a second sensor subsystem configured for acquiring environmental information around the vehicle, a computing system configured for sending a control instruction generated based on the first sensor subsys- tem or the second sensor subsystem to a control system according to at least the state of the sensor system; and the control system configured for changing at least one of a direction of travel and a speed of the vehicle based on the control instruction received from the computing system, wherein the first sensor subsystem comprises a first set of sensors of a first type and a first set of sensors of a second type;

wherein an overlap of horizontal sensing ranges of the first set of sensors of the first type of the first sensor subsystem and the first set of sensors of the second type of the first sensor subsystem is at least 80% of the horizontal sensing range of the first set of sensors of the second type of the first sensor subsystem, wherein the first type is different from the second type, wherein the sensor system further comprises a third sensor subsystem configured for acquiring environmental information around the vehicle, wherein an overlap of horizontal sensing ranges of a first set of sensors of the first type of the third sensor subsystem and the first set of sensors of the first type of the first sensor subsystem is at least 80% of the horizontal sensing range of the first set of sensors of the first type of the third sensor subsystem, but not greater than 40% of the horizontal sensing range of the first set of sensors of the first type of the first sensor subsystem, and wherein an overlap of the horizontal sensing ranges of the first set of sensors of the first type of the third sensor subsystem and a first set of sensors of the first type of the second sensor subsystem is at least 80% of the horizontal sensing range of the first set of sensors of the first type of the third sensor subsystem, but not greater than 50% of the horizontal sensing range of the first set of sensors of the first type of the second sensor subsystem.

2. The vehicle according to claim 1, wherein:

the first sensor subsystem also includes a second set of sensors of the first type and a second set of sensors of the second type;

an overlap of horizontal sensing ranges of the second set of sensors of the first type of the first sensor subsystem and the second set of sensors of the second type of the first sensor subsystem is at least 80% of the horizontal sensing range of the second set of sensors of the second type of the first sensor subsystem.

3. The vehicle according to claim 2, wherein:

a horizontal field of view of the first set of sensors of the first type of the first sensor subsystem is greater than a horizontal field of view of the second set of sensors of the first type of the first sensor subsystem;

a horizontal field of view of the first set of sensors of the second type of the first sensor subsystem is greater than a horizontal field of view of the second set of sensors of the second type of the first sensor subsystem.

4. The vehicle according to claim 2, wherein:

horizontal field of views of the first set of sensors of the first type of the first sensor subsystem and the first set of sensors of the second type of the first sensor subsystem each are greater than 300 degrees;

a horizontal field of view of the second set of sensors of the first type of the first sensor subsystem is less than 120 degrees and a horizontal field of view of the second set of sensors of the second type of the first sensor subsystem is less than 90 degrees.

5. The vehicle according to claim 2, wherein:

a maximum sensing distance of the first set of sensors of the first type of the first sensor subsystem is greater than a maximum sensing distance of the second set of sensors of the first type of the first sensor subsystem, a maximum sensing distance of the first set of sensors of the second type of the first sensor subsystem is greater than a maximum sensing distance of the second set of sensors of the second type of the first sensor subsystem.

6. The vehicle according to claim 1, wherein:

the first set of sensors of the first type of the first sensor subsystem comprise a camera;

the first set of sensors of the second type of the first sensor subsystem include a LIDAR.

7. The vehicle according to claim 1, wherein:

the second sensor subsystem comprises the first set of sensors of the first type and a first set of sensors of the second type;

an overlap of horizontal sensing ranges of the first set of sensors of the first type of the second sensor subsystem and the first set of sensors of the second type of the second sensor subsystem is at least 30% of the horizontal sensing range of the first set of sensors of the second type of the second sensor subsystem, but not greater than 70% of the horizontal sensing range of the first set of sensors of the second type of the second sensor subsystem.

8. The vehicle according to claim 7, wherein:

an overlap of horizontal sensing ranges of the first set of sensors of the first type of the first sensor subsystem and the first set of sensors of the first type of the second sensor subsystem is at least 30% of the horizontal sensing range of the first set of sensors of the first type of the first sensor subsystem, but not greater than 70% of the horizontal sensing range of the first set of sensors of the first type of the first sensor subsystem.

9. The vehicle according to claim 7, wherein:

an overlap of horizontal sensing ranges of the first set of sensors of the second type of the first sensor subsystem and the first set of sensors of the second type of the second sensor subsystem is at least 80% of the horizontal sensing range of the first set of sensors of the second type of the second sensor subsystem.

10. The vehicle according to claim 1, wherein the computing system comprises:

a first computing device configured for generating a first control instruction based on the first sensor subsystem; and a second computing device configured for generating a second control instruction based on the second sensor subsystem.

11. The vehicle according to claim 10, wherein:

the computing system further comprises a control device; and the control device is configured for selecting one of the first control instruction and the second control instruction to be sent to the control system based on a state of at least one of the computing system and the sensor system.

12. A method for controlling a vehicle, wherein the vehicle comprises:

a control system, and a sensor system comprising:

a first sensor subsystem configured for acquiring environmental information around the vehicle;

a second sensor subsystem configured for acquiring environmental information around the vehicle, the method comprising:

sending a control instruction generated based on the first sensor subsystem or the second sensor subsystem to the control system based on at least a state of the sensor system so that the control system changes at least one of a direction of travel and a speed of the vehicle based on the control instruction, wherein the first sensor subsystem comprises a first set of sensors of a first type and a first set of sensors of a second type;

wherein an overlap of horizontal sensing ranges of the first set of sensors of the first type of the first sensor subsystem and the first set of sensors of the second type of the first sensor subsystem is at least 80% of the horizontal sensing range of the first set of sensors of the second type of the first sensor subsystem, wherein the first type is different from the second type, wherein the sensor system further comprises a third sensor subsystem configured for acquiring environmental information around the vehicle, wherein an overlap of horizontal sensing ranges of a first set of sensors of the first type of the third sensor subsystem and the first set of sensors of the first type of the first sensor subsystem is at least 80% of the horizontal sensing range of the first set of sensors of the first type of the third sensor subsystem, but not greater than 40% of the horizontal sensing range of the first set of sensors of the first type of the first sensor subsystem, and wherein an overlap of the horizontal sensing ranges of the first set of sensors of the first type of the third sensor subsystem and the first set of sensors of the first type of the second sensor subsystem is at least 80% of the horizontal sensing range of the first set of sensors of the first type of the third sensor subsystem, but not greater than 50% of the horizontal sensing range of the first set of sensors of the first type of the second sensor subsystem.

13. The method according to claim 12, wherein the control instruction comprises a first control instruction and a second control instruction, and the vehicle further comprises:

a first computing device configured for generating the first control instruction based on the first sensor subsystem; and a second computing device configured for generating the second control instruction based on the second sensor subsystem, wherein the sending the control instruction generated based on the first sensor subsystem or the second sensor subsystem to the control system based on at least the state of the sensor system comprises:

sending the first control instruction or the second control instruction to the control system based on states of the first sensor subsystem, the second sensor subsystem, the first computing device, and the second computing device.

14. The method according to claim 13, wherein the sending the first control instruction or the second control instruction to the control system based on the states of the first sensor subsystem, the second sensor subsystem, the first computing device, and the second computing device comprises:

sending the second control instruction to the control system in response to at least one of the first sensor subsystem and the first computing device being in a fault state and both the second sensor subsystem and the second computing device being in a normal working state; or sending the first control instruction to the control system in response to at least one of the second sensor subsystem and the second computing device being in a fault state and both the first sensor subsystem and the first computing device being in a normal working state.

15. The method according to claim 12, wherein:

the first sensor subsystem also includes a second set of sensors of the first type and a second set of sensors of the second type;

an overlap of horizontal sensing ranges of the second set of sensors of the first type of the first sensor subsystem and the second set of sensors of the second type of the first sensor subsystem is at least 80% of the horizontal sensing range of the second set of sensors of the second type of the first sensor subsystem.

16. The method according to claim 15, wherein:

a horizontal field of view of the first set of sensors of the first type of the first sensor subsystem is greater than a horizontal field of view of the second set of sensors of the first type of the first sensor subsystem;

a horizontal field of view of the first set of sensors of the second type of the first sensor subsystem is greater than a horizontal field of view of the second set of sensors of the second type of the first sensor subsystem.

* * * * *